US011282232B2

(12) United States Patent
Eldar

(10) Patent No.: US 11,282,232 B2
(45) Date of Patent: Mar. 22, 2022

(54) CAMERA CALIBRATION USING DEPTH DATA

(71) Applicant: Intel Corporation, Santa Clara, CA (US)

(72) Inventor: Avigdor Eldar, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/132,671

(22) Filed: Dec. 23, 2020

(65) Prior Publication Data

US 2021/0150762 A1    May 20, 2021

Related U.S. Application Data

(63) Continuation of application No. 15/074,166, filed on Mar. 18, 2016, now abandoned.

(51) Int. Cl.
*G06T 7/80*    (2017.01)

(52) U.S. Cl.
CPC ...... *G06T 7/80* (2017.01); *G06T 2207/10012* (2013.01); *G06T 2207/10024* (2013.01);
(Continued)

(58) Field of Classification Search
CPC ............. G06T 7/80; G06T 2207/10012; G06T 2207/10024; G06T 2207/10028; G06T 2207/10048; G06T 2207/30244
See application file for complete search history.

(56) References Cited

U.S. PATENT DOCUMENTS

2010/0277571 A1    11/2010    Xu et al.
2012/0287247 A1    11/2012    Stenger et al.
(Continued)

OTHER PUBLICATIONS

United States Patent and Trademark Office, "Final Office action," issued in connection with U.S. Appl. No. 15/074,166, dated Oct. 15, 2020, 27 pages.
(Continued)

*Primary Examiner* — Joseph W Becker
(74) *Attorney, Agent, or Firm* — Hanley, Flight & Zimmerman, LLC

(57) ABSTRACT

An example system disclosed herein includes a camera to: capture a first image set of a first view of an object when the camera is in a first position, the first image set including first infrared data and first RGB data; capture a second image set of a second view of the object when the camera is in a second position, the second image set including second infrared data and second RGB data; and capture a third image set of a third view of the object when the camera is in a third position, the third image set including third infrared data and third RGB data. The example system also includes at least one processor to: identify a plurality of features among the first view, the second view, and the third view; align the second view relative to the first view by using one or more of the features; align the third view relative to the first view by using one or more of the features; determine first three-dimensional data from the first infrared data; determine second three-dimensional data from the second infrared data; determine third three-dimensional data from the third infrared data; average the first three-dimensional data, the second three-dimensional data, and the third three-dimensional data; create a calibration model based on the average; determine a refined view based on the calibration model; and compute a three dimensional to two dimensional projection based on the refined view.

20 Claims, 8 Drawing Sheets

(52) U.S. Cl.
CPC .............. *G06T 2207/10028* (2013.01); *G06T 2207/10048* (2013.01); *G06T 2207/30244* (2013.01)

(56) References Cited

U.S. PATENT DOCUMENTS

| | | | |
|---|---|---|---|
| 2013/0010079 | A1 | 1/2013 | Zhang et al. |
| 2015/0178927 | A1 | 6/2015 | Olszamowski |
| 2015/0213589 | A1 | 7/2015 | Chou et al. |
| 2015/0213647 | A1 | 7/2015 | Laffargue et al. |
| 2015/0288951 | A1 | 10/2015 | Mallet et al. |
| 2016/0012588 | A1 | 1/2016 | Taguchi et al. |
| 2016/0012646 | A1* | 1/2016 | Huang .................. G06T 5/005 345/419 |
| 2016/0073102 | A1 | 3/2016 | Meloun et al. |
| 2016/0182893 | A1 | 6/2016 | Wan |
| 2016/0288330 | A1* | 10/2016 | Konolige ............. H04N 13/254 |
| 2017/0270654 | A1 | 7/2017 | Eldar |

OTHER PUBLICATIONS

United States Patent and Trademark Office, "Non-Final Office action," issued in connection with U.S. Appl. No. 15/074,166, dated Apr. 2, 2020, 27 pages.
United States Patent and Trademark Office, "Final Office action," issued in connection with U.S. Appl. No. 15/074,166, dated Dec. 12, 2019, 22 pages.
United States Patent and Trademark Office, "Non-Final Office action," issued in connection with U.S. Appl. No. 15/074,166, dated May 31, 2019, 24 pages.
Albarelli et al., Robust Camera Calibration using Inaccurate Targets, 2010, 10 pages.
Ho, Nghia, Finding Optimal Rotation and Translation Between Corresponding 3D Points, revised May 10, 2013, 79 Pages.
Kinect Fusion, Apr. 4, 2016, 9 pages.
Camera Calibration and 3D Reconstruction, OpenCV 2.4.12.0 Documentation, retrieved Apr. 4, 2016, 51 pages.
Feature Detection, OpenCV 2.4.12.0 Documentation, retrieved Apr. 4, 2016, 15 pages.
Prince, "Computer Vision: Models, Learning and Inference", retrieved Apr. 4, 2016, 4 pages.
Sturm et al., "On Plane-Based Camera Calibration: A General Algorithm, Singularities, Applications", 1999, 6 pages.
Zhang et al., "Chapter 2: Camera Calibration," Emerging Topics in Computer Vision Book, Prentice Hall Professional Technical Reference, Retrieved on Apr. 4, 2016, 54 pages.
International Seraching Authority, "Search Report," issued in connection with U.S. Patent application No. PCT/US2017/014825, dated Apr. 25, 2017, 3 pages.
International Seraching Authority, "Written Opinion," issued in connection with U.S. Patent application No. PCT/US2017/014825, dated Apr. 25, 2017, 9 pages.

* cited by examiner

200A

500

CAMERA CALIBRATION USING DEPTH DATA

RELATED APPLICATION

This patent arises from a continuation of U.S. patent application Ser. No. 15/074,166, which was filed on Mar. 18, 2016. U.S. patent application Ser. No. 15/074,166 is hereby incorporated herein by reference in its entirety. Priority to U.S. patent application Ser. No. 15/074,166 is hereby claimed.

BACKGROUND ART

Electronic devices, such as tablets, phablets, smartphones, mobile phones, desktops, laptops, gaming devices, all-in-one systems, and the like may include various cameras for capturing images. The electronic devices may require calibration of camera with regard to how the camera perceives the world. In some cases, the electronic device may include a plurality of cameras configured to work individually or in concert. Each camera may be used to capture different image information, such as depth, color space, or other information regarding a scene.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Figure 1:
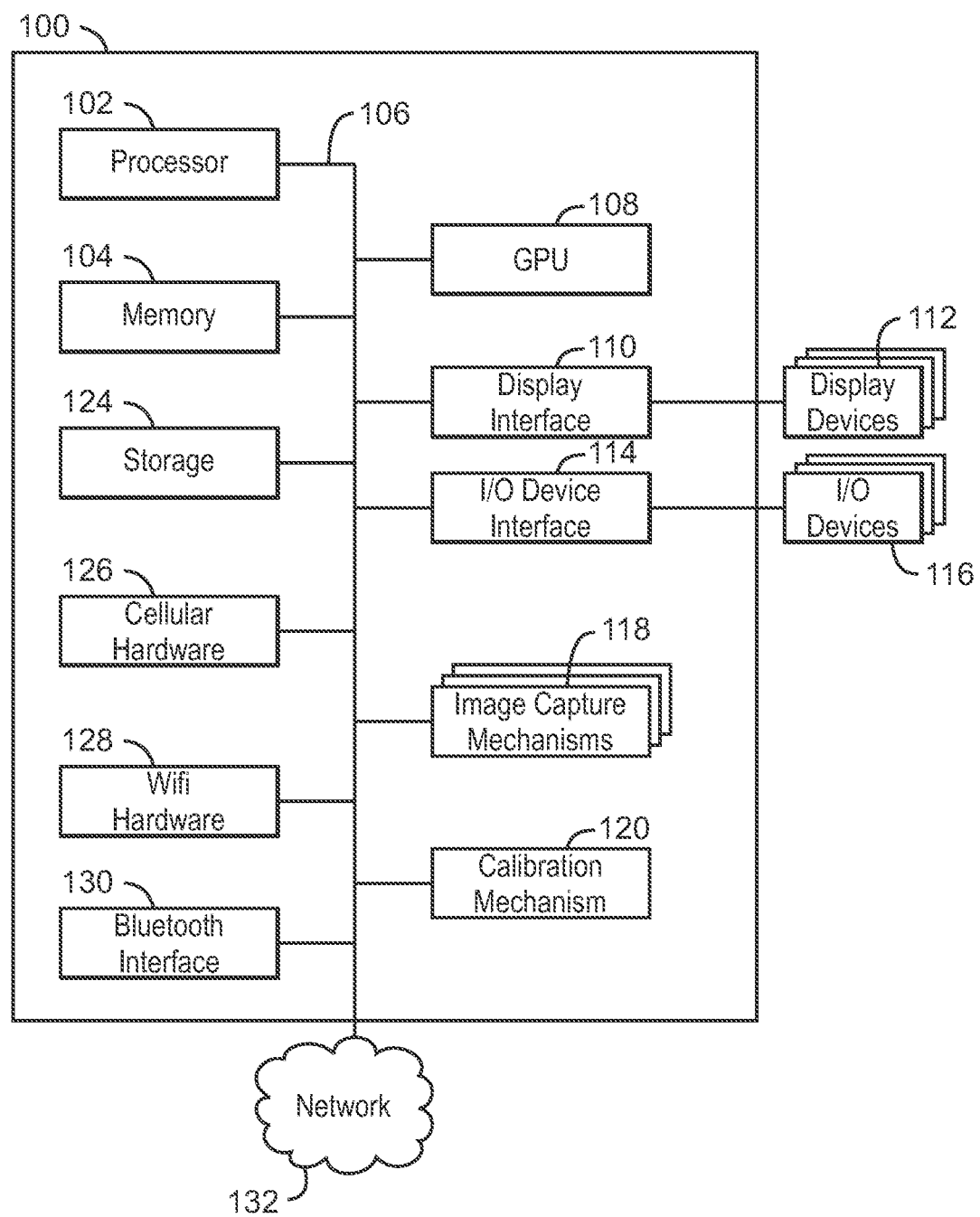
FIG. 1 is a block diagram of an exemplary system that enables camera calibration using depth data.

Typically, each camera of a plurality of cameras in a system is calibrated prior to use. In some cases, the calibration of multiple cameras requires capturing many images of a calibration target at different angels and distances from the cameras of a given system that includes multiple cameras. The calibration target may be a pattern with an easily distinguished geometry. For example, the calibration target may be a printed checkerboard. In the typical calibration process, the checkerboard must have a precise and accurate physical geometry. There is often high costs associated with generating a precise and accurate calibration target.

Embodiments described herein enable camera calibration using depth data. In embodiments, the present techniques enable a depth camera to red, green, blue (RGB) camera calibration. Through this calibration, the depth camera and RGB camera may be set such that the cameras properly capture images. Calibration may be performed from a depth sensor to an RGB sensor, utilizing available three dimensional depth data instead of limited two dimensional image data. The actual physical target geometry is computed as part of the process, rather than required as input to the calibration process.

Some embodiments may be implemented in one or a combination of hardware, firmware, and software. Further, some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of an exemplary system that enables camera calibration using depth data. The electronic device 100 may be, for example, a laptop computer, tablet computer, mobile phone, smart phone, or a wearable device, among others. The electronic device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the electronic device 100 may include more than one CPU 102. The memory device 104 can include random access memory (RAM), read only memory (ROM), flash memory, or any other suitable memory systems. For example, the memory device 104 may include dynamic random access memory (DRAM).

The electronic device 100 also includes a graphics processing unit (GPU) 108. As shown, the CPU 102 can be coupled through the bus 106 to the GPU 108. The GPU 108 can be configured to perform any number of graphics operations within the electronic device 100. For example, the GPU 108 can be configured to render or manipulate graphics images, graphics frames, videos, streaming data, or the like, to be rendered or displayed to a user of the electronic device 100. In some embodiments, the GPU 108 includes a number of graphics engines, wherein each graphics engine is configured to perform specific graphics tasks, or to execute specific types of workloads.

The CPU 102 can be linked through the bus 106 to a display interface 110 configured to connect the electronic device 100 to one or more display devices 112. The display devices 112 can include a display screen that is a built-in component of the electronic device 100. In embodiments, the display interface 110 is coupled with the display devices 112 via any networking technology such as cellular hardware 124, Wifi hardware 126, or Bluetooth Interface 128 across the network 132. The display devices 112 can also include a computer monitor, television, or projector, among others, that is externally connected to the electronic device 100.

The CPU 102 can also be connected through the bus 106 to an input/output (I/O) device interface 114 configured to connect the electronic device 100 to one or more I/O devices 116. The I/O devices 116 can include, for example, a keyboard and a pointing device, wherein the pointing device can include a touchpad or a touchscreen, among others. The I/O devices 116 can be built-in components of the electronic device 100, or can be devices that are externally connected to the electronic device 100. Accordingly, in embodiments, the I/O device interface 114 is coupled with the I/O devices 116 via any networking technology such as cellular hardware 124, Wifi hardware 126, or Bluetooth Interface 128 across the network 132. The I/O devices 116 can also include any I/O device that is externally connected to the electronic device 100.

The electronic device 100 also includes image capture mechanisms 118. The image capture mechanisms may be a plurality of cameras. The image capture mechanisms 118 may also include a plurality of sensors. In embodiments, the image capture mechanisms 118 may be a depth camera and an RGB camera. Additionally, in embodiments, the image capture mechanisms 118 may be a depth sensor and an RGB sensor. In some embodiments, the image capture mechanisms 118 can be a camera, stereoscopic camera, infrared sensor, and the like. The image capture mechanisms 118 are used to capture image information and the corresponding depth information. The image capture mechanisms 118 may include sensors such as a depth sensor, RGB sensor, an image sensor, an infrared sensor, an X-Ray photon counting sensor, a light sensor, or any combination thereof. The image sensors may include charge-coupled device (CCD) image sensors, complementary metal-oxide-semiconductor (CMOS) image sensors, system on chip (SOC) image sensors, image sensors with photosensitive thin film transistors, or any combination thereof. In some embodiments, a sensor is a depth sensor. The depth sensor may be used to capture the depth information associated with the image information. In some embodiments, a driver may be used to operate a sensor within the image capture devices 118, such as a depth sensor.

The electronic device 118 may also include a calibration mechanism 120. The calibration mechanism may use depth data to make the calibration process more robust. In embodiments, the calibration mechanism 120 is to calibrate a plurality of cameras using depth data, thereby removing the burden of having accurate targets and potentially introduce new calibration scenarios. New calibration scenarios include, but are not limited to natural objects as targets instead of designated checkerboard targets. During calibration, the depth camera center is maintained at a center location relative to the calibration target. For example, the location may be described according to Cartesian coordinates, where x, y, and z are each zero. This single frame of reference is used to capture all views of the calibration target onto a reference location to create an average calibration target model. In embodiments, a calibration target model is a function used to transformation between world and image coordinates. Calibration is used to obtain the correct model parameters.

In embodiments, camera calibration results in a linear calibration target model that is defined by eleven parameters. The eleven parameters include camera location (3 parameters: x, y, z), orientation (3 parameters: roll, pitch, and yaw), focal length (1 parameter: distance), pixel scale (1 parameter), pixel aspect ratio (1 parameter), and image plane center offset (2 parameters). The calibration target model, through these parameters projection for each camera that maps a point in the camera image from a three-dimensional point in space to a two-dimensional location in the camera image.

The electronic device 100 also includes a storage device 124. The storage device 124 is a physical memory such as a hard drive, an optical drive, a flash drive, an array of drives, or any combinations thereof. The storage device 124 can store user data, such as audio files, video files, audio/video files, and picture files, among others. The storage device 124 can also store programming code such as device drivers, software applications, operating systems, and the like. The programming code stored to the storage device 124 may be executed by the CPU 102, GPU 108, or any other processors that may be included in the electronic device 100.

The CPU 102 may be linked through the bus 106 to cellular hardware 126. The cellular hardware 126 may be any cellular technology, for example, the 4G standard (International Mobile Telecommunications-Advanced (IMT-Advanced) Standard promulgated by the International Telecommunications Union—Radio communication Sector (ITU-R)). In this manner, the electronic device 100 may access any network 132 without being tethered or paired to another device, where the cellular hardware 126 enables access to the network 132.

The CPU 102 may also be linked through the bus 106 to WiFi hardware 128. The WiFi hardware 128 is hardware according to WiFi standards (standards promulgated as Institute of Electrical and Electronics Engineers' (IEEE) 802.11 standards). The WiFi hardware 128 enables the electronic device 100 to connect to the Internet using the Transmission Control Protocol and the Internet Protocol (TCP/IP). Accordingly, the electronic device 100 can enable end-to-end connectivity with the Internet by addressing, routing, transmitting, and receiving data according to the TCP/IP protocol without the use of another device. Additionally, a Bluetooth Interface 130 may be coupled to the CPU 102 through the bus 106. The Bluetooth Interface 130 is an interface according to Bluetooth networks (based on the Bluetooth standard promulgated by the Bluetooth Special Interest Group). The Bluetooth Interface 130 enables the electronic device 100 to be paired with other Bluetooth enabled devices through a personal area network (PAN). Accordingly, the network 132 may be a PAN. Examples of Bluetooth enabled devices include a laptop computer, desktop computer, ultrabook, tablet computer, mobile device, or server, among others.

The block diagram of FIG. 1 is not intended to indicate that the electronic device 100 is to include all of the components shown in FIG. 1. Rather, the computing system 100 can include fewer or additional components not illustrated in FIG. 1 (e.g., sensors, power management integrated circuits, additional network interfaces, etc.). The electronic device 100 may include any number of additional components not shown in FIG. 1, depending on the details of the specific implementation. Furthermore, any of the functionalities of the CPU 102 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 2A:
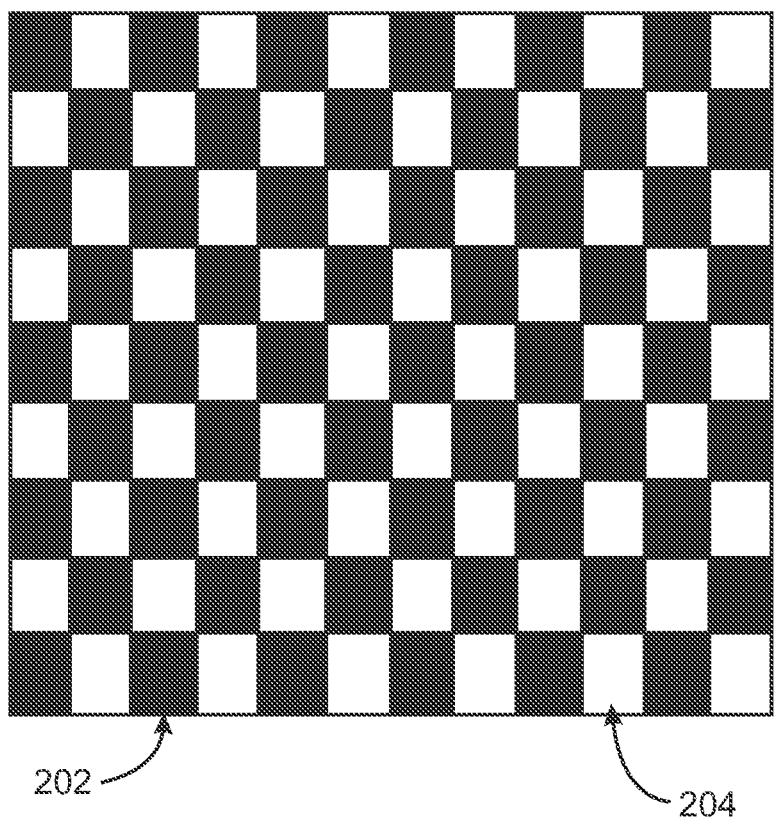
FIG. 2A is a diagram illustrating a target to be used in calibration.

FIG. 2A is a diagram illustrating a target 200A to be used in calibration. As illustrated, the calibration target 200A is a checkerboard pattern. Thus, the target 200A includes a plurality of squares, where the plurality of squares include a plurality of black squares 202 and a plurality of white squares 204. In examples, for use as a calibration target, each square is 2 centimeters by 2 centimeters.

In existing calibration processes, the physical geometry of the target such as the target 200A must be known in advance and is an input to a calibration algorithm. The physical geometry may include either three dimensional coordinates for a three dimensional target or two dimensional measurements for the more commonly used, two dimensional, planar targets. In both, cases achieving an accurate target model is an expensive process. For example, printing a checkerboard pattern for a two dimensional calibration target with squares that are precisely a particular size can be an expensive process, and requires costly equipment to generate a precise and accurate target.

Figure 2B:
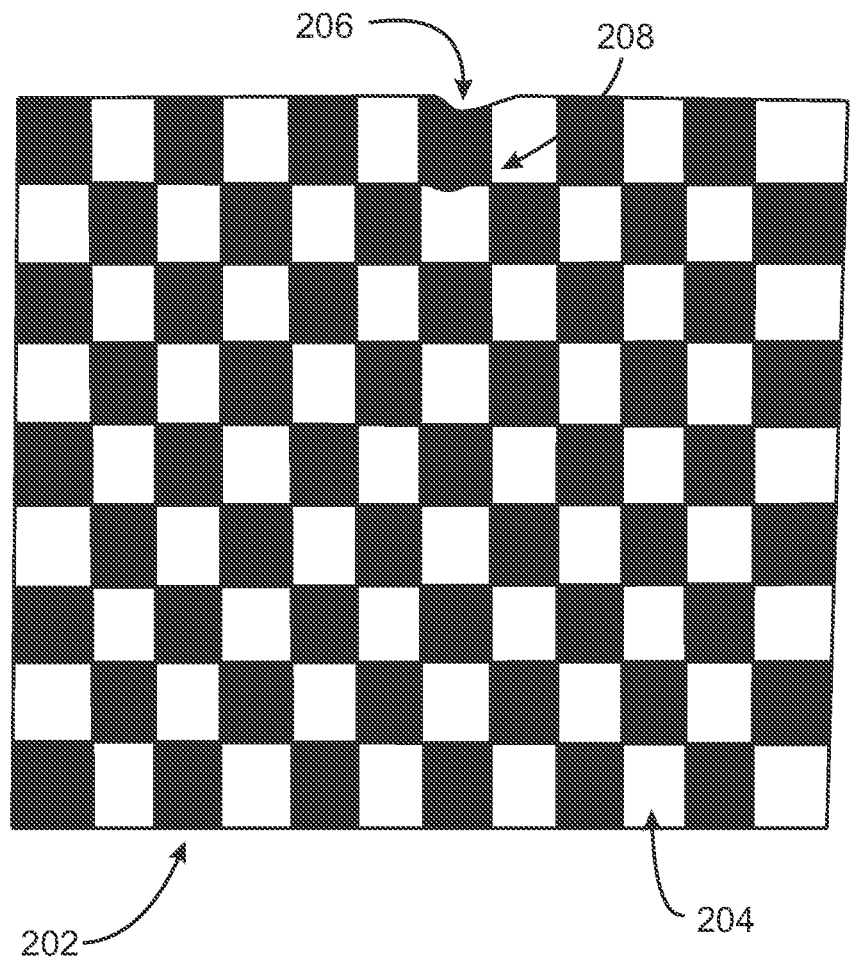
FIG. 2B is an illustration of a target placed in error for use in calibration.

Additionally, an accurate and precisely printed target may be incorrectly placed for calibration by an operator. FIG. 2B is an illustration of a target 200B placed in error for use in calibration. For calibration, an operator typically places the calibration target on a platform so that cameras of the electronic device can be calibrated by capturing the calibration target using the cameras. The calibration target may be printed onto paper that is applied to a platform using an adhesive. The target 200B illustrates deformities that can occur when placing the calibration target. For example, bends 206 and 208 illustrate deformities that may be present when the calibration target is placed. In some cases, the bends 206 and 208 are a result of dimpling, puckering, or an otherwise non-smooth placement of the checkerboard target onto a platform. The bends 206 and 208 result in non-planar regions that are not expected in a typical calibration scenario. If these deformities are present when using the conventional calibration that requires prior knowledge of the size and location of the calibration target, conventional calibration may fail or provide erroneous results.

Thus, to implement conventional calibration the calibration target must be accurately and precisely printed with extremely tight tolerances to satisfy a calibration algorithm that requires these exact measurements. The present techniques overcome the need for a precise and accurate calibration target by using depth data to reconstruct the calibration target. In this manner, the exact dimensions of the calibration target as discovered, thereby eliminating the need for an accurately and precisely printed calibration target.

Since the calibration target does not need to be known in advance, the calibration according to the present techniques can be implemented in the field because the calibration target does not need to be known in advance. As discussed above, the calibration process described herein utilizes available depth data to calculate an accurate and precise three dimensional geometry of the actual physical structure of the calibration target. In the manner, accurate and precise target creation is eliminated. Moreover, the present techniques also reduce the setup burden of the operator.

Depth data, as used herein, may refer to representations of depth information such as a depth field, a point cloud, a depth map, or a three dimensional (three dimensional) polygonal mesh that may be used to indicate the depth of three dimensional objects within the image. While the techniques are described herein using a depth data, any depth representation can be used. In some cases, depth data used to reconstruct the calibration target can be noisy. To overcome noisy depth data, the present techniques employ smoothing techniques. In embodiments, smoothing may be performed via averaging as described herein as well as sub-pixel refinement.

Figure 3:
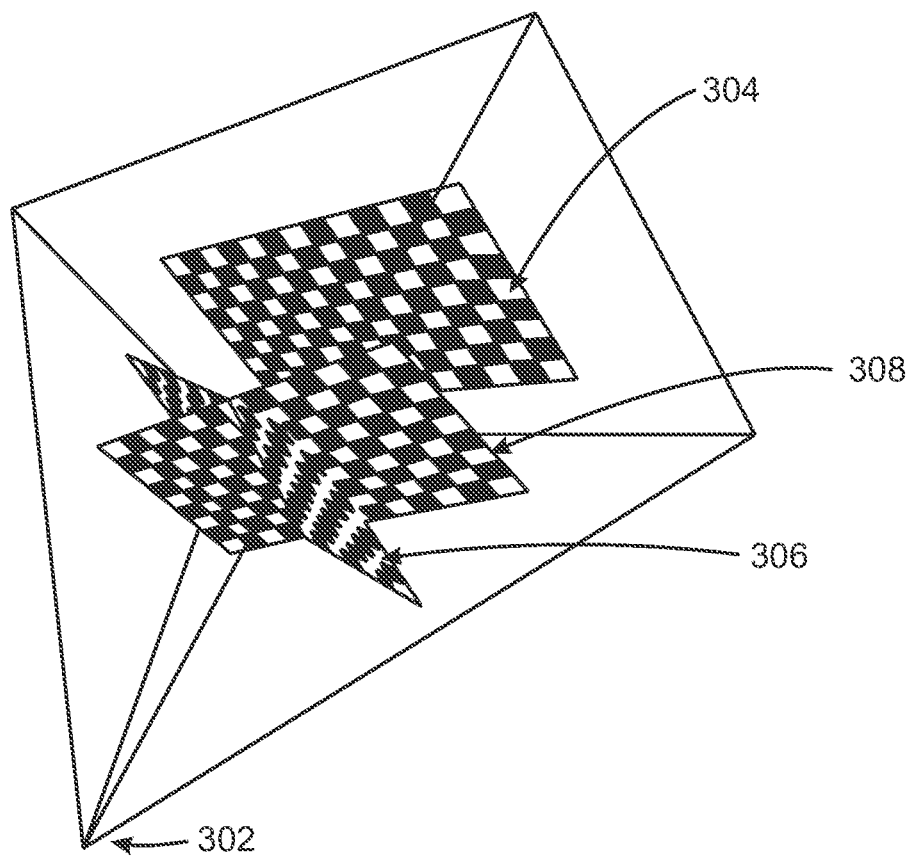
FIG. 3 is an illustration of a plurality of views of a calibration target.

FIG. 3 is an illustration of a plurality of views 300 of a calibration target. The camera center is located at reference number 302. The plurality of views includes a view 304, a view 308, and a view 310. For ease of description, three views are illustrated. However, the present techniques can be implemented with any number of views.

The camera may be placed in a single frame of reference with regard to each view. In embodiments, the single frame of reference, as described herein, indicates a frame reference relative to the camera. Specifically, the depth camera center may be located at x, y, z=(0,0,0) for all three dimensional views 304, 306, and 308 of the target. Each view may be captured by repositioning the calibration target or the camera. Once a number of views are captured, the multiple views may be aligned onto a reference location.

Put another way, as a result of the depth data obtained from the depth camera, for each capture of the calibration target, the three dimensional location (X,Y,Z) relative to the camera can be derived. The camera may be positioned at coordinate x, y, z=(0,0,0) in space, and the three dimensional coordinates of all views can be derived using the depth data from each view. In other words, the camera acts as the single frame of reference for all views. In embodiments, the present techniques may use multiple reference locations. For example, the corners of each view may be used to define reference locations for each view.

After the multiple views have been aligned onto a reference location, the views may be averaged to create an average, less noisy, "model." Thus, in each of views 304, 306, and 308, there is a common point that provides the same view in each of the views. Features of the calibration target may be found in each view, and then a transform is found for each view. A close formula may be used to estimate a rigid transform (camera pose) between two locations of the same object in space. This technique may be used when noise (or measurement error) is minimal. In embodiments, a Best Rigid Transform is used to obtain a transform for each view. Alternatively, the depth data from the multiple views can be averaged by tracking the camera pose as each view is captured. The camera pose, and how each camera pose relates to the other tracked camera poses can be used to average the views into a single model. In embodiments, when the depth data is noisy, a Kinect Fusion technique may be used to detect a rigid transform for each view.

With conventional calibration techniques, averaging is not possible because there is no unique reference frame. In essence, there is no equivalent averaging process for two dimensional measurements as this is the calibration process itself. Put another way, when using a single set of measurements in a single dimension, any attempt to find the relation between two dimensional images of the target results in a three dimensional to two dimensional projection transformation, which requires knowledge of camera intrinsic parameters.

Figure 4A:
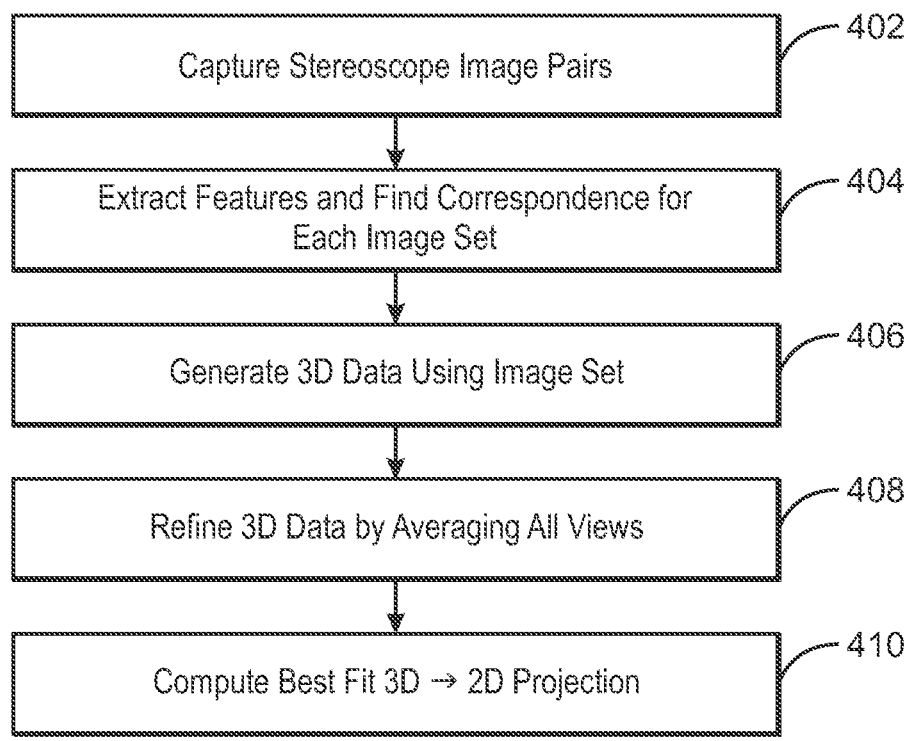
FIG. 4A is a process flow diagram of a method that enables camera calibration using depth data.

FIG. 4A is a process flow diagram of a method 400 that enables camera calibration using depth data. At block 402, stereoscopic image pairs are captured. The stereoscopic image pairs may be captured for a plurality of views. The depth data may be captured as a stereoscopic infrared (IR) image pair. An RGB image may also be captured for each view. In embodiments, an image set includes an RGB image and a depth image. In examples, features may be detected from an image set including RGB and IR images and matched. In this example, the depth and resulting 30 coordinate may be computed for each matched pair. In another example, the image set can include structured light/coded light, where the input is a depth map and a single RGB/IR image. Features may be detected on IR/RGB image, the corresponding 30 coordinate is then computed from depth map.

At block 404, features are extracted from each image. Correspondence for each image set may be found for each feature in the RGB image and the depth image. As used herein, features may be points of interest on a calibration target. For example, with a checkerboard, the intersection of each square with another square may be a feature. Features may also include edges, lines, corners, and the like.

Thus, for each real world coordinate, there are two image coordinates (one derived from the depth image pair and one in the RGB image) that correspond to the real world coordinate. At block 406, three dimensional data is generated using the image pairs. In embodiments, a depth module is used to generate three dimensional data from the captured depth image. Stereo image pairs may be used to explicitly reconstruct per feature three dimensional data.

In embodiments, subpixel refinement is performed for each detected feature. Subpixel refinement may act as a function to compute a more accurate image location of the detected feature. By observing that each vector from the center the current pixel to a second point located within a neighborhood of the pixel is orthogonal to the image gradient at subject to image and measurement noise. A sum of the gradients in the neighborhood of the pixel results in a new, more accurate pixel location. This process can be performed iteratively until the coordinate location stays within a particular threshold.

At block 408, the three dimensional data is refined by averaging all views. Averaging may be used to reduce the noise that may occur in each individual view, where each view includes a depth image. Because each capture is within a single frame of reference, three dimensional correspondences between the calibration targets can be found and the results can be averaged. In embodiments, the average may be found by finding a best fit rigid transform for each view to a reference view. The transform may be the best rotation and/or translation that will align the points in the current view to the reference view. In embodiments, 'best' is in terms of least square errors. This transform may also be called the Euclidean or Rigid transform since the shape and size of the view is preserved. For each view, a transform is computed such that $$V'=T_V(V)$$

where Tv is the best fit rigid transform, V is the current view, and V' is very close to the reference view. Each transformed view V' is then averaged, which results in a calibration target model (TM). Now that a calibration target model TM has been found, each view can be replaced with a refined view:

$$V\text{refined}=T_V^{-1}(TM)$$

At block 410, the best three dimensional to two dimensional projection is computed based on the refined three dimensional data and the corresponding two dimensional RGB features. The refined three dimensional data and corresponding two dimensional RGB features are found via the calibration target model. Accordingly, the projection is computed using a function that estimates the intrinsic camera parameters and extrinsic parameters for each of the views.

In embodiments, the extrinsic parameters may be identical for all views as a result of the single frame of reference. These extrinsic parameters describe the calibration between the RGB and depth sensors. Once the model is developed, the three dimensional data from multiple view results in a linear transformation. Additionally, in embodiments, the calibration results in the capture of eleven parameters that define the relationship between cameras of the device. The eleven parameters are the intrinsic parameters that define the relation of the RGB camera to the world. Additionally, there are six extrinsic parameters that define the relationship between the RGB and depth sensors (rotation and translation).

Figure 4B:
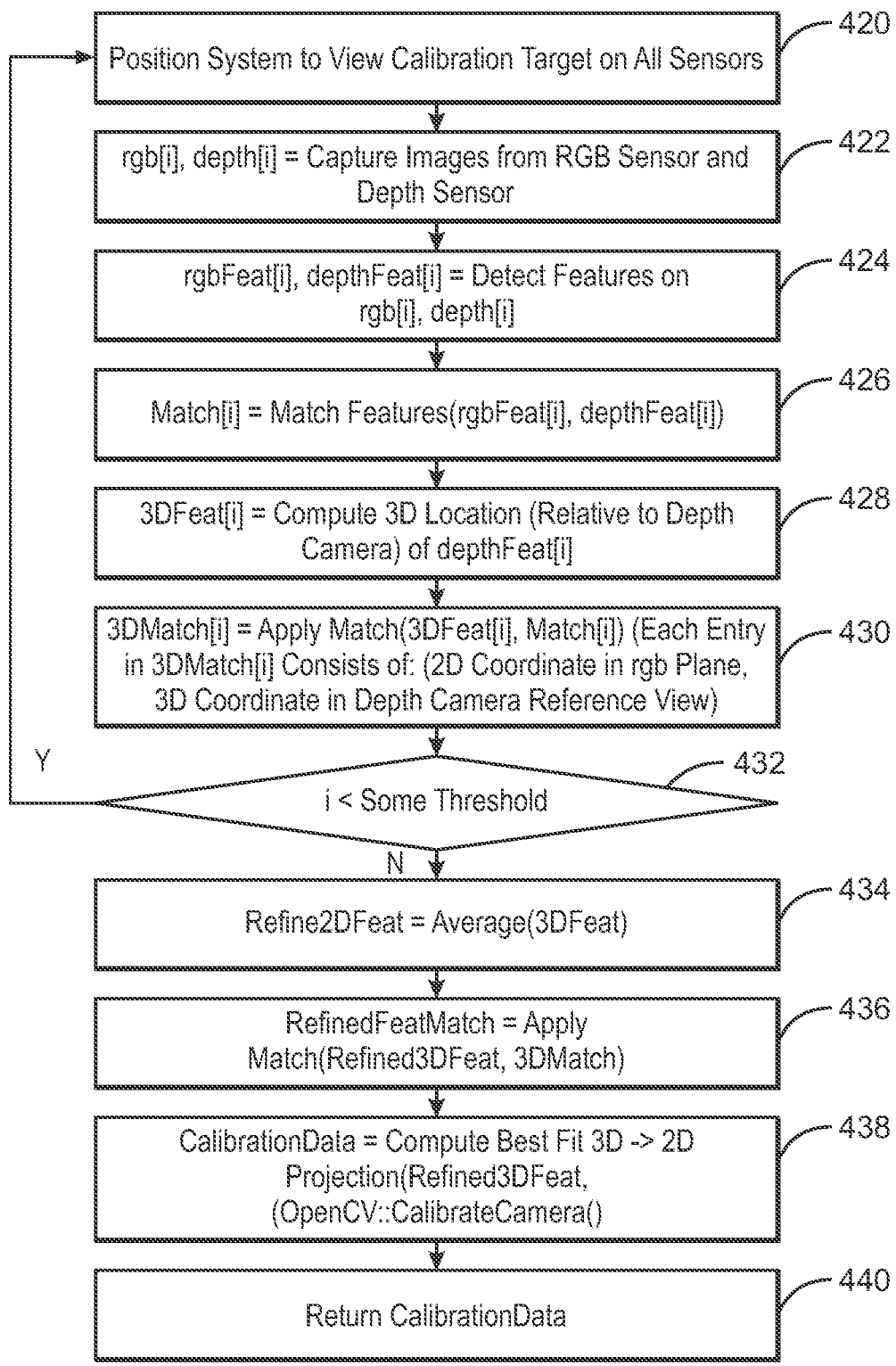
FIG. 4B is a process flow diagram of another method that enables camera calibration using depth data.

FIG. 4B is a process flow diagram of a method 400B that enables camera calibration using depth data. In FIG. 4B depth data and RGB data are obtained and processed to generate a calibration target model. At block 420, the system is positioned to view the calibration target on all systems. In embodiments, the system may be an electronic device (FIG. 1). At block 422, images are captured using the RGB sensor and the depth sensor. These images may be represented as RGB[i] and Depth[i], where i is the number of views to be obtained. At block 424, features are detected on each of RGB[i] and Depth[i], where the features are represented as RGBfeat[i] and Depthfeat[i]. Each image RGB[i] and Depth [i] may contain a plurality of features.

At block 426, the features found on RGB[i] are matched to features on Depth[i], and vice versa. The matched features may be represented by Match[i]. At block 428, a location of a three dimensional feature Depthfeat[i], is computed relative to the depth camera. The location of the three dimensional feature may be represented by 3Dfeat[i]. At block 430, the match is applied. In embodiments, the 3Dfeat[i] and Match[i] as used to derive a two dimensional coordinate in the RGB[i] and a corresponding three dimensional coordinate in the Depth[i].

At block 432, it is determined if i is less than a threshold. If i is less than a threshold, process flow returns to block 420 where the system is positioned to capture another view. If i is greater than a threshold, process flow continues to block 434 sub-pixel refinement is performed. At block 434, each feature in 3Dfeat[i] is processed via sub-pixel refinement. The result of the sub-pixel refinement is a refinement of the three dimensional features across views to obtain a refined pixel location for each feature. At block 436, a refined feature match RefinedFeatMatch is found by using Refined3Dfeat[i] and 3OMatch[i] to derive a two dimensional coordinate in the RGB[i] and a corresponding three dimensional coordinate in the Depth[i].

At block 438, calibration data is obtained by computing the best three dimensional to two dimensional projection based on the refined three dimensional data Refined3OFeat. In embodiments, an Open Source Computer Vision (OpenCV) calibrate function may be used to obtain the calibration data. OpenCV may refer to the OpenCV Specification, released Dec. 21, 2015. At block 440, the calibration data may be stored and applied to data captured by the RGB and depth sensors.

Figure 5:
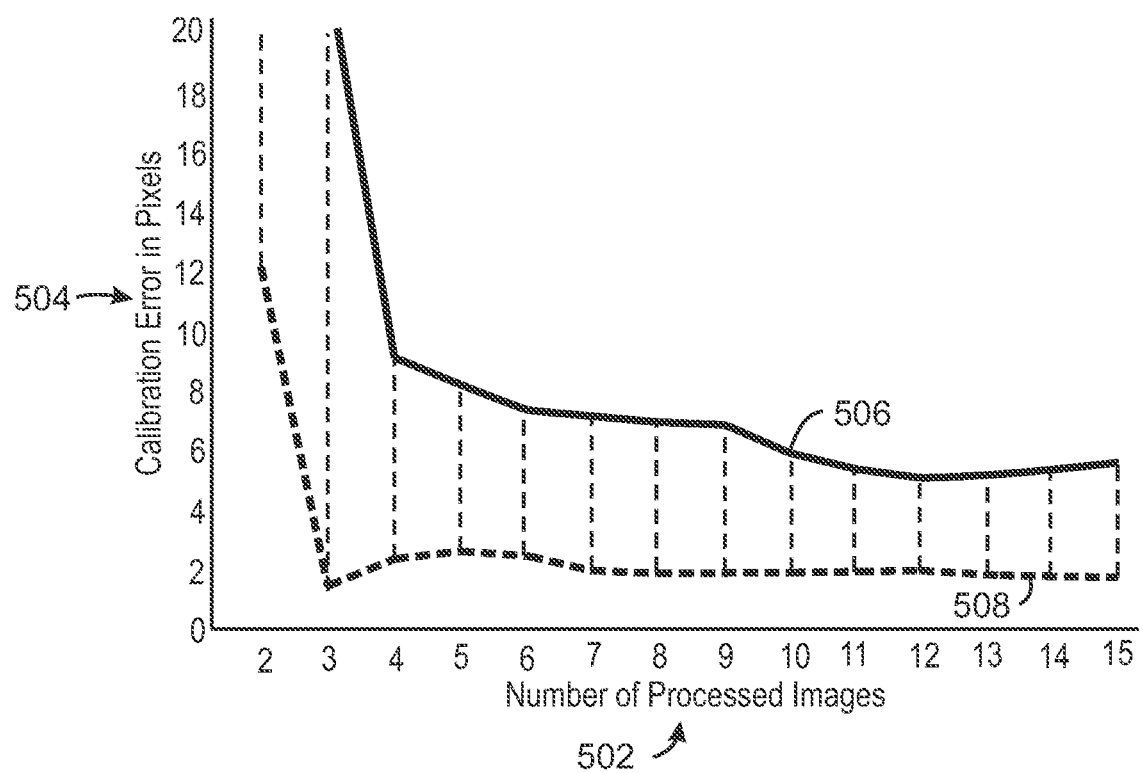
FIG. 5 is a line graph illustrating error with traditional calibration and averaged calibration.

FIG. 5 is a line graph 500 illustrating error with traditional calibration and the calibration techniques described herein. The line graph 500 includes an x-axis 502 representing the number of process images or views. The line graph 500 also includes a y-axis 504 representing errors calibration errors in pixels. The traditional calibration is represented by the line 506, and the averaged calibration is represented by the line 508. As illustrated, the number of calibration errors is lower for the averaged calibration when compared with the traditional calibration, regardless of the number of process views or images.

As illustrated, the present techniques result in a better absolute calibration error value (approximately 1.6 pixel error vs. approximately 5.4 pixels with the traditional method). In addition, convergence associated with the present techniques is are faster, where three images are sufficient to reduce calibration errors, and two images is the absolute minimum required for mathematical correctness.

The present techniques have better tolerance to operator errors and also employ noise reduction techniques that cannot be employed by traditional calibration methods, neither for 20 nor 30 targets. Moreover, the present techniques have a better resilience to noise, as there are less unknown parameters to compute since the depth camera frame of reference is used for all scenes.

Figure 6:
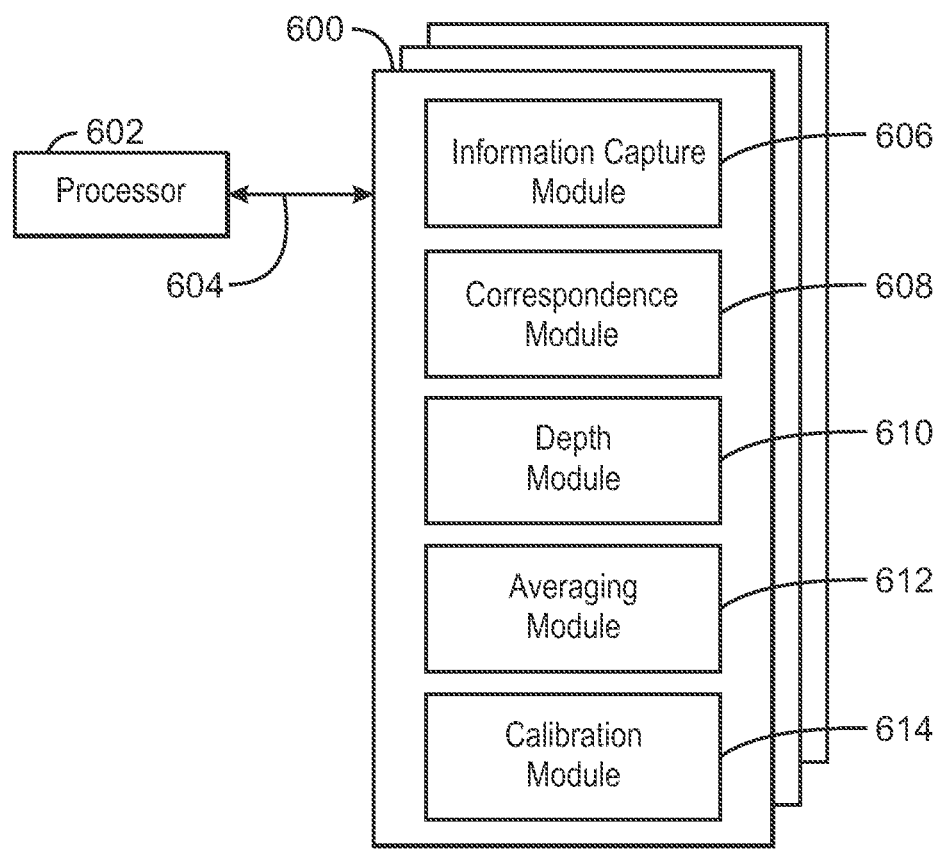
FIG. 6 is a block diagram showing media that contains logic for camera calibration using depth data.

FIG. 6 is a block diagram showing media 600 that contains logic for camera calibration using depth data. The media 600 may be a computer-readable medium, including a non-transitory medium that stores code that can be accessed by a processor 602 over a computer bus 604. For example, the computer-readable media 600 can be volatile or non-volatile data storage device. The media 600 can also be a logic unit, such as an Application Specific Integrated Circuit (ASIC), a Field Programmable Gate Array (FPGA), or an arrangement of logic gates implemented in one or more integrated circuits, for example.

The media 600 may include modules 606-614 configured to perform the techniques described herein. For example, an image capture module 606 may be configured to capture images using the depth camera and the RGB camera.

A correspondence module 608 may be configured to extract features and find the correspondence between features. A depth module 610 may be configured generate depth data for each feature based on the stereoscopic data captured for each feature point. At block 612, an averaging module averages depth data from all views. At block 614, a calibration module completes calibration by obtaining a three dimensional to two dimensional best fit projection. In some embodiments, the modules 607-614 may be modules of computer code configured to direct the operations of the processor 602.

The block diagram of FIG. 6 is not intended to indicate that the media 600 is to include all of the components shown in FIG. 6. Further, the media 600 may include any number of additional components not shown in FIG. 6, depending on the details of the specific implementation.

Example 1 is an apparatus for calibrating multiple cameras. The apparatus includes an image capture module to capture depth data and sensor data for a plurality of views; an extraction module to extract a first plurality of features from the depth data and a second plurality of features from the sensor data for each view; a correspondence module to locate corresponding features in the first plurality of features and the second plurality of features for each view; a depth module to generate three-dimensional data for each feature of the first plurality of features for each view; and a calibration module to calibrate the multiple cameras by matching the generated three dimensional data with the corresponding features in the first plurality of features and the second plurality of features.

Example 2 includes the apparatus of example 1, including or excluding optional features. In this example, a controller is to average the three-dimensional data across multiple views, and the calibration module is to calibrate the multiple cameras by matching the averaged three dimensional data with the corresponding features in the first plurality of features and the second plurality of features.

Example 3 includes the apparatus of any one of examples 1 to 2, including or excluding optional features. In this example, the apparatus includes averaging the three dimensional data across multiple views by calculating a best fit rigid transform from each view of a plurality of views to a reference view.

Example 4 includes the apparatus of any one of examples 1 to 3, including or excluding optional features. In this example, the apparatus includes averaging the three dimensional data by tracking a camera pose as each view of the plurality of views is captured and using the camera pose to average the views into a single view.

Example 5 includes the apparatus of any one of examples 1 to 4, including or excluding optional features. In this example, the depth data is obtained from a stereoscopic infrared image pair.

Example 6 includes the apparatus of any one of examples 1 to 5, including or excluding optional features. In this example, the apparatus includes applying subpixel refinement to each feature of the plurality of features.

Example 7 includes the apparatus of any one of examples 1 to 6, including or excluding optional features. In this example, features are detected by observing points of interest in each view of the plurality of views.

Example 8 includes the apparatus of any one of examples 1 to 7, including or excluding optional features. In this example, calibrating the multiple views results in a calibration target model used to transformation between world and image coordinates.

Example 9 includes the apparatus of any one of examples 1 to 8, including or excluding optional features. In this example, the plurality of views include multiple views of a calibration target. Optionally, calibration is performed without prior knowledge of the calibration target.

Example 10 is a method for calibrating multiple cameras. The method includes capturing depth data and sensor data for a plurality of views; extracting a plurality of corresponding features from the depth data and the sensor data; generating three-dimensional data for each feature of the plurality of corresponding features; and calibrating the multiple cameras by calculating a projection based on the three-dimensional data and the plurality of corresponding features.

Example 11 includes the method of example 10, including or excluding optional features. In this example, the three-dimensional data is averaged across the multiple views, and the multiple cameras are calibrated by calculating a projection based on the averaged three-dimensional data and the plurality of corresponding features across multiple views.

Example 12 includes the method of any one of examples 10 to 11, including or excluding optional features. In this example, the method includes averaging the three dimensional data across multiple views by calculating a best fit rigid transform from each view of a plurality of views to a reference view.

Example 13 includes the method of any one of examples 10 to 12, including or excluding optional features. In this example, the method includes averaging the three dimensional data by tracking a camera pose as each view of the plurality of views is captured and using the camera pose to average the views into a single view.

Example 14 includes the method of any one of examples 10 to 13, including or excluding optional features. In this example, the depth data is obtained from a stereoscopic infrared image pair.

Example 15 includes the method of any one of examples 10 to 14, including or excluding optional features. In this example, the sensor data is an RGB sensor data.

Example 16 includes the method of any one of examples 10 to 15, including or excluding optional features. In this example, the depth data is obtained from structured light.

Example 17 includes the method of any one of examples 10 to 16, including or excluding optional features. In this example, the plurality of views include multiple views of a calibration target.

Example 18 includes the method of any one of examples 10 to 17, including or excluding optional features. In this example, calibration is performed without prior knowledge of a calibration target.

Example 19 includes the method of any one of examples 10 to 18, including or excluding optional features. In this example, averaging the three dimensional data and applying a subpixel refinement to the plurality of features results in a smoothing of the depth data.

Example 20 is a system for calibrating multiple cameras. The system includes a depth camera and a sensor to capture images; a memory configured to receive image data; and a processor coupled to the memory, depth camera, and sensor, the processor to: capture depth data and sensor data for a plurality of views; extract a plurality of corresponding features from the depth data and the sensor data; generate three-dimensional data for each feature of the plurality of corresponding features; and calibrate the multiple cameras by calculating a projection based on the three-dimensional data and the plurality of corresponding features.

Example 21 includes the system of example 20, including or excluding optional features. In this example, the processor is to average the three-dimensional data for each view, and the calibration module is to calibrate the multiple cameras by matching the averaged three dimensional data with the corresponding features in the first plurality of features and the second plurality of features.

Example 22 includes the system of any one of examples 20 to 21, including or excluding optional features. In this example, the system includes averaging the three dimensional data across multiple views by calculating a best fit rigid transform from each view of a plurality of views to a reference view.

Example 23 includes the system of any one of examples 20 to 22, including or excluding optional features. In this example, the system includes averaging the three dimensional data by tracking a camera pose as each view of the plurality of views is captured and using the camera pose to average the views into a single view.

Example 24 includes the system of any one of examples 20 to 23, including or excluding optional features. In this example, the depth data is obtained from a stereoscopic infrared image pair.

Example 25 includes the system of any one of examples 20 to 24, including or excluding optional features. In this example, the system includes applying subpixel refinement to each feature of the plurality of features.

Example 26 includes the system of any one of examples 20 to 25, including or excluding optional features. In this example, features are detected by observing points of interest in each view of the plurality of views.

Example 27 includes the system of any one of examples 20 to 26, including or excluding optional features. In this example, calibrating the multiple views results in a calibration target model used to transformation between world and image coordinates.

Example 28 includes the system of any one of examples 20 to 27, including or excluding optional features. In this example, the plurality of views include multiple views of a calibration target. Optionally, calibration is performed without prior knowledge of the calibration target.

Example 29 is an apparatus for calibrating multiple cameras. The apparatus includes an image capture module to capture depth data and sensor data for a plurality of views; a means to extract a first plurality of features from the depth data and a second plurality of features from the sensor data for each view; a means to locate corresponding features in the first plurality of features and the second plurality of features for each view; a means to generate three-dimensional data for each feature of the first plurality of features for each view; and a means to calibrate the multiple cameras by matching the generated three dimensional data with the corresponding features in the first plurality of features and the second plurality of features.

Example 30 includes the apparatus of example 29, including or excluding optional features. In this example, a means to average views is to average the three-dimensional data for each view, and the means to calibrate the multiple cameras is to match the averaged three dimensional data with the corresponding features in the first plurality of features and the second plurality of features.

Example 31 includes the apparatus of any one of examples 29 to 30, including or excluding optional features. In this example, the apparatus includes averaging the three dimensional data across multiple views by calculating a best fit rigid transform from each view of a plurality of views to a reference view.

Example 32 includes the apparatus of any one of examples 29 to 31, including or excluding optional features. In this example, the apparatus includes averaging the three dimensional data by tracking a camera pose as each view of the plurality of views is captured and using the camera pose to average the views into a single view.

Example 33 includes the apparatus of any one of examples 29 to 32, including or excluding optional features. In this example, the depth data is obtained from a stereoscopic infrared image pair.

Example 34 includes the apparatus of any one of examples 29 to 33, including or excluding optional features. In this example, the apparatus includes applying subpixel refinement to each feature of the plurality of features.

Example 35 includes the apparatus of any one of examples 29 to 34, including or excluding optional features. In this example, features are detected by observing points of interest in each view of the plurality of views.

Example 36 includes the apparatus of any one of examples 29 to 35, including or excluding optional features. In this example, calibrating the multiple views results in a calibration target model used to transformation between world and image coordinates.

Example 37 includes the apparatus of any one of examples 29 to 36, including or excluding optional features. In this example, the plurality of views include multiple views of a calibration target. Optionally, calibration is performed without prior knowledge of the calibration target.

Example 38 is at least one machine readable medium comprising a plurality of instructions that. The computer-readable medium includes instructions that direct the processor to capture depth data and sensor data for a plurality of views; extract a plurality of corresponding features from the depth data and the sensor data; generate three-dimensional data for each feature of the plurality of corresponding features; and calibrate the multiple cameras by calculating a projection based on the three-dimensional data and the plurality of corresponding features.

Example 39 includes the computer-readable medium of example 38, including or excluding optional features. In this example, the three-dimensional data is averaged across the multiple views, and the multiple cameras are calibrated by calculating a projection based on the averaged three-dimensional data and the plurality of corresponding features across multiple views.

Example 40 includes the computer-readable medium of any one of examples 38 to 39, including or excluding optional features. In this example, the computer-readable medium includes averaging the three dimensional data across multiple views by calculating a best fit rigid transform from each view of a plurality of views to a reference view.

Example 41 includes the computer-readable medium of any one of examples 38 to 40, including or excluding optional features. In this example, the computer-readable medium includes averaging the three dimensional data by tracking a camera pose as each view of the plurality of views is captured and using the camera pose to average the views into a single view.

Example 42 includes the computer-readable medium of any one of examples 38 to 41, including or excluding optional features. In this example, the depth data is obtained from a stereoscopic infrared image pair.

Example 43 includes the computer-readable medium of any one of examples 38 to 42, including or excluding optional features. In this example, the sensor data is an RGB sensor data.

Example 44 includes the computer-readable medium of any one of examples 38 to 43, including or excluding optional features. In this example, the depth data is obtained from structured light.

Example 45 includes the computer-readable medium of any one of examples 38 to 44, including or excluding optional features. In this example, the plurality of views include multiple views of a calibration target.

Example 46 includes the computer-readable medium of any one of examples 38 to 45, including or excluding optional features. In this example, calibration is performed without prior knowledge of a calibration target.

Example 47 includes the computer-readable medium of any one of examples 38 to 46, including or excluding optional features. In this example, averaging the three dimensional data and applying a subpixel refinement to the plurality of features results in a smoothing of the depth data.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system comprising:
a camera to:
capture a first image set of a first view of an object when the camera is in a first position, the first image set including first infrared data and first RGB data;
capture a second image set of a second view of the object when the camera is in a second position, the second image set including second infrared data and second RGB data; and
capture a third image set of a third view of the object when the camera is in a third position, the third image set including third infrared data and third RGB data; and
at least one processor to:
identify a plurality of features among the first view, the second view, and the third view;
align the second view relative to the first view by using one or more of the features;
align the third view relative to the first view by using one or more of the features;
determine first three-dimensional data from the first infrared data;
determine second three-dimensional data from the second infrared data;
determine third three-dimensional data from the third infrared data;
average the first three-dimensional data, the second three-dimensional data, and the third three-dimensional data;
create a calibration model based on the average;
determine a refined view based on the calibration model; and
compute a three dimensional to two dimensional projection based on the refined view.

2. The system of claim 1, wherein to average the first three-dimensional data, the second three-dimensional data, and the third three-dimensional data, the at least one processor is to determine:
- a first transform view of the second view relative to the first view based on rigid transformation,
- a second transform view of the third view relative to the first view based on rigid transformation, and
- average three dimensional data in the first transform view and the second transform view.

3. The system of claim 2, wherein the rigid transformation includes rotation.

4. The system of claim 2, wherein the rigid transformation includes translation.

5. The system of claim 2, wherein the rigid transformation includes least square errors.

6. The system of claim 2, wherein the at least one processor is to determine a refined view based on an inverse of the rigid transformation.

7. The system of claim 1, wherein the at least one processor is to calibrate the camera based on the three dimensional to two dimensional projection.

8. The system of claim 1, wherein the at least one processor is to compute a physical geometry of the object based on the three dimensional to two dimensional projection.

9. The system of claim 1, wherein the at least one processor is to:
- identify a pixel in a first feature of the plurality of features;
- determine orthogonal gradient data based on a plurality of vectors from the pixel to another pixel; and
- calculate the pixel location.

10. The system of claim 9, wherein the at least one processor is to compute a location of the first feature based on the pixel location.

11. A computer readable storage device or storage disc comprising instructions that, when executed, cause one or more processors to at least:
access:
- a first image set of a first view of an object, the first view captured by a camera in a first position, the first image set including first infrared data and first RGB data;
- a second image set of a second view of the object, the second view captured by the camera in a second position, the second image set including second infrared data and second RGB data; and
- a third image set of a third view of the object, the third view captured by the camera in a third position, the third image set including third infrared data and third RGB data;

identify a plurality of features among the first view, the second view, and the third view;
align the second view relative to the first view by using one or more of the features;
align the third view relative to the first view by using one or more of the features;
determine first three-dimensional data from the first infrared data;
determine second three-dimensional data from the second infrared data;
determine third three-dimensional data from the third infrared data;
average the first three-dimensional data, the second three-dimensional data, and the third three-dimensional data;
create a calibration model based on the average;
determine a refined view based on the calibration model; and
compute a three dimensional to two dimensional projection based on the refined view.

12. The storage device or storage of claim 11, wherein to average the first three-dimensional data, the second three-dimensional data, and the third three-dimensional data, the instructions case one or more processors to determine:
- a first transform view of the second view relative to the first view based on rigid transformation,
- a second transform view of the third view relative to the first view based on rigid transformation, and
- average three dimensional data in the first transform view and the second transform view.

13. The storage device or storage of claim 12, wherein the rigid transformation includes rotation.

14. The storage device or storage of claim 12, wherein the rigid transformation includes translation.

15. The storage device or storage of claim 12, wherein the rigid transformation includes least square errors.

16. The storage device or storage of claim 12, wherein the instructions cause one or more processors to determine a refined view based on an inverse of the rigid transformation.

17. The storage device or storage of claim 11, wherein instructions cause one or more processors to calibrate the camera based on the three dimensional to two dimensional projection.

18. The storage device or storage of claim 11, wherein the instructions cause one or more processors to compute a physical geometry of the object based on the three dimensional to two dimensional projection.

19. The storage device or storage of claim 11, wherein the instructions cause one or more processors to:
- identify a pixel in a first feature of the plurality of features;
- determine orthogonal gradient data based on a plurality of vectors from the pixel to another pixel;
- calculate the pixel location; and
- determine the first feature location based on the pixel location.

20. The storage device or storage of claim 19, wherein the instructions case the one or more processors to compute a location of the first feature based on the pixel location.

* * * * *